United States Patent
Hiraki (10) Patent No.: US 9,335,714 B2
(45) Date of Patent: May 10, 2016

(54) IMAGE PROCESSING SYSTEM HAVING A CHARGING FUNCTION AND CHARGE APPARATUS

(71) Applicant: Oki Data Corporation, Tokyo (JP)

(72) Inventor: Kentaro Hiraki, Tokyo (JP)

(73) Assignee: Oki Data Corporation, Tokyo (JP)

(*) Notice: Subject to any disclaimer, the term of this patent is extended or adjusted under 35 U.S.C. 154(b) by 0 days.

(21) Appl. No.: 14/624,052

(22) Filed: Feb. 17, 2015

(65) Prior Publication Data
US 2015/0241810 A1   Aug. 27, 2015

(30) Foreign Application Priority Data

Feb. 24, 2014 (JP) .................................. 2014-033100

(51) Int. Cl.
| | | |
|---|---|---|
| G03G 21/02 | (2006.01) | |
| H04N 1/34 | (2006.01) | |
| G07F 17/26 | (2006.01) | |
| G03G 15/00 | (2006.01) | |

(52) U.S. Cl.
CPC ............ *G03G 21/02* (2013.01); *G03G 15/5075* (2013.01); *G07F 17/266* (2013.01); *H04N 1/342* (2013.01); *G03G 2215/00105* (2013.01)

(58) Field of Classification Search
CPC .............. G03G 15/5075; G03G 21/02; G03G 2215/00105; H04N 1/34; H04N 1/342; H04N 1/344; H04N 1/346; G07F 17/266
USPC .............................. 399/8, 79; 705/16, 20, 400
See application file for complete search history.

(56) References Cited

U.S. PATENT DOCUMENTS

| | | | | | |
|---|---|---|---|---|---|
| 5,956,698 | A * | 9/1999 | Lacheze | ................. | G06Q 20/20 705/16 |
| 7,743,000 | B2 * | 6/2010 | Allen | ..................... | G06K 15/00 705/400 |
| 2007/0182984 | A1 * | 8/2007 | Ragnet | ............... | G06Q 30/0283 358/1.15 |
| 2009/0066995 | A1 * | 3/2009 | Mukund | ................ | G03G 21/02 358/1.15 |
| 2010/0067036 | A1 * | 3/2010 | Oka | ........................ | G06Q 10/00 358/1.14 |
| 2012/0191601 | A1 * | 7/2012 | Yoshida | ............... | G06Q 20/102 705/40 |

FOREIGN PATENT DOCUMENTS

| | | | | |
|---|---|---|---|---|
| JP | 2009-233940 | A | * | 10/2009 |
| JP | 2010-002464 | A | * | 1/2010 |

* cited by examiner

*Primary Examiner* — Robert Beatty
(74) *Attorney, Agent, or Firm* — Panitch Schwarze Belisario & Nadel LLP (57) ABSTRACT

An image processing system is formed of an image forming apparatus and a charge apparatus connected to the image forming apparatus. The image forming apparatus comprises a communication unit, a memory unit for storing charge information to be stored in the charge apparatus when disconnected from the charge apparatus, and a control unit for controlling the charge information stored in the memory unit to be stored in the memory unit when connecting to the charge apparatus. The charge apparatus comprises a communication unit, a memory unit for storing the charge information received from the image forming apparatus, a judgment unit for judging as to whether the charge information stored in the memory unit is in a renewal waiting state; and a control unit for notifying a user where the judgment unit judges that the charge information stored in the memory unit is in the renewal waiting state.

15 Claims, 12 Drawing Sheets

| ITEM | VALUE |
| --- | --- |
| USER ID OF PRINTING JOB SENDER | <USER ID> |
| PRINTER ID OF PRINTING JOB DESTINATION | <PRINTER ID> |
| PRINTING SETTING | <PRINTING SETTING> |

FIG.9

| ITEM | VALUE |
| --- | --- |
| USER ID OF PRINTING JOB SENDER | <USER ID> |
| PRINTER ID OF PRINTING JOB DESTINATION | <PRINTER ID> |
| JOB ID | <JOB ID> |
| PRINTING SETTING | <PRINTING SETTING> |

FIG.10

| ITEM | VALUE | OPERATOR WITH PRINTER USE AMOUNT (C1) | OPERATOR WITH OTHER CHARGE AMOUNT CALCULATION (C2) |
|---|---|---|---|
| PRINTER ID | <PRINTER ID> | | |
| PAPER SIZE UNIT PRICE | <AMOUNT> | <OPERATOR> | <OPERATOR> |
| PAPER TYPE UNIT PRICE | <AMOUNT> | <OPERATOR> | <OPERATOR> |
| PRINTING SHEET NUMBER UNIT PRICE | <AMOUNT> | <OPERATOR> | <OPERATOR> |
| MULTICOLOR PRINTING PAGE UNIT PRICE | <AMOUNT> | <OPERATOR> | <OPERATOR> |
| MONOCHROME PRINTING PAGE UNIT PRICE | <AMOUNT> | <OPERATOR> | <OPERATOR> |
| MULTICOLOR TONER USE AMOUNT UNIT PRICE | <AMOUNT> | <OPERATOR> | <OPERATOR> |
| MONOCHROME TONER USE AMOUNT UNIT PRICE | <AMOUNT> | <OPERATOR> | <OPERATOR> |
| MULTICOLOR DRUM USE AMOUNT UNIT PRICE | <AMOUNT> | <OPERATOR> | <OPERATOR> |
| MONOCHROME DRUM USE AMOUNT UNIT PRICE | <AMOUNT> | <OPERATOR> | <OPERATOR> |
| BELT USE AMOUNT UNIT PRICE | <AMOUNT> | <OPERATOR> | <OPERATOR> |
| FIXING DEVICE USE AMOUNT UNIT PRICE | <AMOUNT> | <OPERATOR> | <OPERATOR> |
| STAPLER USE NUMBER UNIT PRICE | <AMOUNT> | <OPERATOR> | <OPERATOR> |

FIG.11

| ITEM | VALUE |
|---|---|
| USER ID | <USER ID> |
| PRINTER ID | <PRINTER ID> |
| MULTICOLOR TONER USE AMOUNT | <MULTICOLOR TONER USE AMOUNT> |
| MONOCHROME TONER USE AMOUNT | <MONOCHROME TONER USE AMOUNT> |
| MULTICOLOR DRUM USE AMOUNT | <MULTICOLOR DRUM USE AMOUNT> |
| MONOCHROME DRUM USE AMOUNT | <MONOCHROME DRUM USE AMOUNT> |
| BELT USE AMOUNT | <BELT USE AMOUNT> |
| FIXING DEVICE USE AMOUNT | <FIXING DEVICE USE AMOUNT> |
| STAPLER USE NUMBER | <STAPLER USE NUMBER> |
| PAGE ENTRY 0 | <PAPER SIZE> |
| | <PAPER TYPE> |
| | <PAPER THICKNESS> |
| | <DOUBLE SIDES/SINGLE SIDE> |
| | <PRINTING SHEET NUMBER> |
| | <MULTICOLOR PRINTING PAGE NUMBER> |
| | <MONOCHROME PRINTING PAGE NUMBER> |
| ⋮ | |
| PAGE ENTRY n | <PAPER SIZE> |
| | <PAPER TYPE> |
| | <PAPER THICKNESS> |
| | <DOUBLE SIDES/SINGLE SIDE> |
| | <PRINTING SHEET NUMBER> |
| | <MULTICOLOR PRINTING PAGE NUMBER> |
| | <MONOCHROME PRINTING PAGE NUMBER> |

FIG. 12

| ITEM | VALUE | CHARGE AMOUNT |
|---|---|---|
| USER ID | <USER ID> | <AMOUNT> |
| PRINTER ID | <PRINTER ID> | <AMOUNT> |
| MULTICOLOR TONER USE AMOUNT | <MULTICOLOR TONER USE AMOUNT> | <AMOUNT> |
| MONOCHROME TONER USE AMOUNT | <MONOCHROME TONER USE AMOUNT> | <AMOUNT> |
| MULTICOLOR DRUM USE AMOUNT | <MULTICOLOR DRUM USE AMOUNT> | <AMOUNT> |
| MONOCHROME DRUM USE AMOUNT | <MONOCHROME DRUM USE AMOUNT> | <AMOUNT> |
| BELT USE AMOUNT | <BELT USE AMOUNT> | <AMOUNT> |
| FIXING DEVICE USE AMOUNT | <FIXING DEVICE USE AMOUNT> | <AMOUNT> |
| STAPLER USE NUMBER | <STAPLER USE NUMBER> | <AMOUNT> |
| PAGE ENTRY 0 | <PAPER SIZE> | <AMOUNT> |
| | <PAPER TYPE> | <AMOUNT> |
| | <PAPER THICKNESS> | <AMOUNT> |
| | <DOUBLE SIDES/SINGLE SIDE> | <AMOUNT> |
| | <PRINTING SHEET NUMBER> | <AMOUNT> |
| | <MULTICOLOR PRINTING PAGE NUMBER> | <AMOUNT> |
| | <MONOCHROME PRINTING PAGE NUMBER> | <AMOUNT> |

⋮

| | | |
|---|---|---|
| PAGE ENTRY n | <PAPER SIZE> | <AMOUNT> |
| | <PAPER TYPE> | <AMOUNT> |
| | <PAPER THICKNESS> | <AMOUNT> |
| | <DOUBLE SIDES/SINGLE SIDE> | <AMOUNT> |
| | <PRINTING SHEET NUMBER> | <AMOUNT> |
| | <MULTICOLOR PRINTING PAGE NUMBER> | <AMOUNT> |
| | <MONOCHROME PRINTING PAGE NUMBER> | <AMOUNT> |
| TOTAL | TOTAL | <AMOUNT> |

FIG. 13

| ITEM | VALUE |
|---|---|
| USER ID | <USER ID> |

FIG. 14

| ITEM | VALUE |
|---|---|
| USER ID | <USER ID> |

FIG. 15

THE CHARGE INFORMATION OF THE DESIGNATED USER ID IS NOT IN THE UPDATED STATE.
THE INFORMATION WILL BE RENEWED TO THE UPDATED STATE WHEN BECOMING COMMUNICABLE WITH THE PRINTER.

CLOSE — F2

IMAGE PROCESSING SYSTEM HAVING A CHARGING FUNCTION AND CHARGE APPARATUS

CROSS REFERENCE TO RELATED APPLICATIONS

This application claims priority benefits under 35 USC, section 119 on the basis of Japanese Patent Application No. 2014-033100, the disclosure of which is incorporated herein by reference.

BACKGROUND OF THE INVENTION

1. Field of the Invention

This invention relates to an image processing system constituted of an image forming apparatus and a charge apparatus connected to the image forming apparatus.

2. Description of Related Art

A charge or billing system has been known in which a printing job is charged upon notifying a charge apparatus installed separately from the image forming apparatus of the printing completion of the printing job. With such a charge system, charge to the printing job may not be executed accurately where the connection between the image forming apparatus and the charge apparatus is failed.

To solve the above problem, a publication such as, e.g., Japanese Patent Application Publication (A1) No. 2010-002464 discloses an image processing system memorizing the charge information on a side of the image forming apparatus when the connection between the image forming apparatus and the charge apparatus comes to be failed and updating the charge information stored in the image forming apparatus in reflecting from the charge apparatus at a timing that the image forming apparatus and the charge apparatus become connected.

With such a prior art, however, when the user confirms the charge information at the charge apparatus, the charge information held in the charge apparatus may not be in the updated state, and can be erroneous charge information, so that the user cannot recognize correct charge information.

It is therefore an object of the invention to provide an image processing system detecting a renewal waiting state of the charge information held at the charge apparatus and recognizing erroneous data.

SUMMARY OF THE INVENTION

To solve the above problems, an image processing system according to a first aspect of the invention is formed of an image forming apparatus and a charge apparatus connected to the image forming apparatus. The image forming apparatus comprises: an image forming apparatus side communication unit for communicating the charge apparatus; an image forming apparatus side memory unit for storing charge information to be stored in the charge apparatus when disconnected from the charge apparatus; and an image forming apparatus side control unit for controlling the charge information stored in the image forming apparatus side memory unit to be stored in the image forming apparatus side memory unit when connecting to the charge apparatus. The charge apparatus comprises: a charge apparatus side communication unit for communicating the image forming apparatus; a charge apparatus side memory unit for storing the charge information received from the image forming apparatus; a judgment unit for judging as to whether the charge information stored in the charge apparatus side memory unit is in a renewal waiting state; and a charge apparatus side control unit for making control to notify a user where the judgment unit judges that the charge information stored in the charge apparatus side memory unit is in the renewal waiting state.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF EMBODIMENTS

Selected embodiments of the present invention will now be explained with reference to the drawings. It will be apparent to those skilled in the art from this disclosure that the following descriptions of the embodiments of the invention are provided for illustration only and not for the purpose of limiting the invention as defined by the appended claims and their equivalents.

Figure 1:
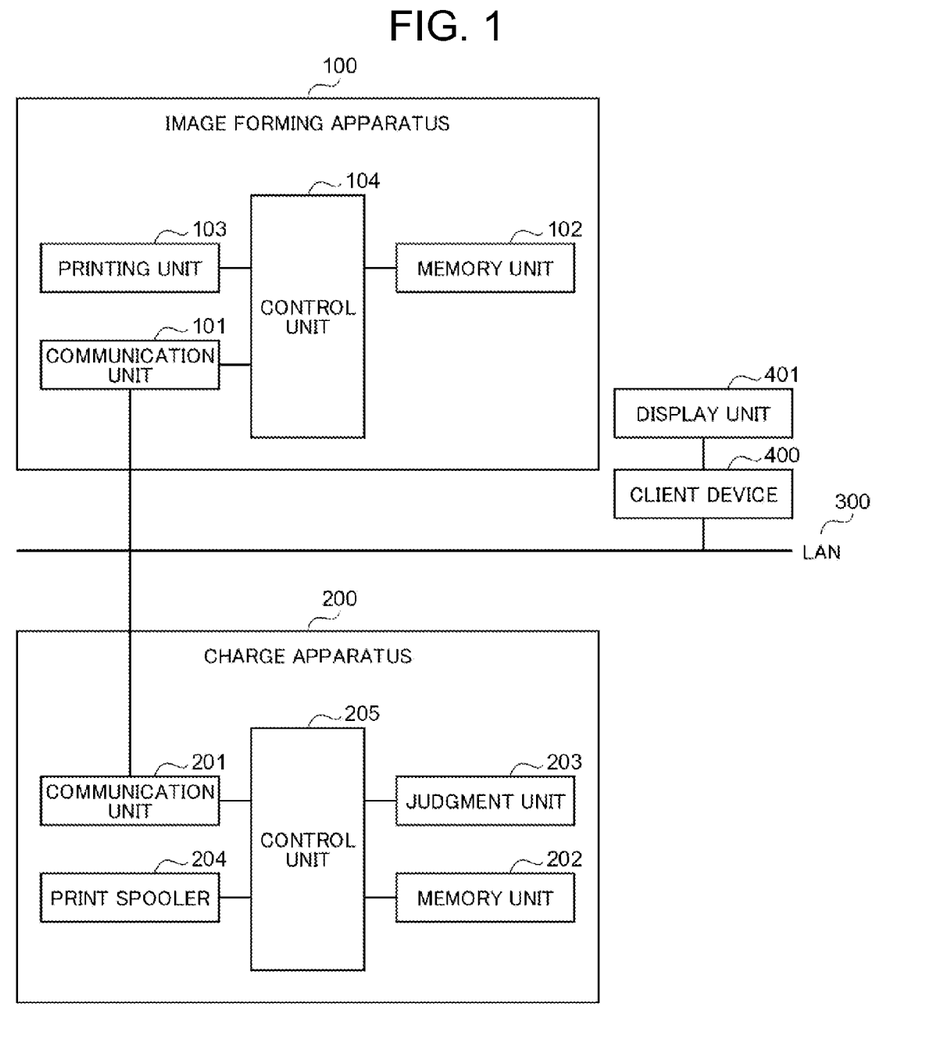
FIG. 1 is a block diagram showing a structure of an image processing system according to an embodiment of the invention.

FIG. 1 is a block diagram showing a structure of an image processing system according to an embodiment of the invention. In this embodiment, an image processing system is described in which an image forming apparatus 100, a charge apparatus 200, and a client device 400 as a host computer or an information processing apparatus are connected via a LAN (Local Area Network) 300.

The image forming apparatus 100 is an apparatus capable of printing images to recording media on a basis of the printing job received from the client device 400 via the charge apparatus 200. The image forming apparatus 100 thus formed includes a communication unit 101 serving as an image forming apparatus side communication unit, a memory unit 102 serving as an image forming apparatus side memory unit, a printing unit 103, and a control unit 104 serving as an image forming apparatus side control unit.

The communication unit 101 has a communication control means using TCP/IP protocol such as, e.g., network interface, for transmitting and receiving information via the LAN 300 with the client device 400 and the charge apparatus 200.

The memory unit 102 includes a rewritable memory device or devices such as, e.g., a flash memory or an HDD (Hard Disk Drive), for memorizing information received via the communication unit 101 and setting contents.

The printing unit 103 includes a printing engine of such as, e.g., electrophotographic and inkjet, and prints images based the received printing job to the recording medium such as a paper.

The control unit 104 includes a CPU (Central Processing Unit) not shown, and integrally controls the communication unit 101, the memory unit 102, and the printing unit 103.

The charge apparatus 200 is an apparatus holding the charge information as information of charged consequences according to the printing jobs processed at the image forming apparatus 100. The charge apparatus 200 includes a communication unit 201 serving as a charge apparatus side communication unit, a memory unit 202 serving as a charge apparatus side memory unit 202, a judgment unit 203, a print spooler 204, and a control unit 205 serving as a charge apparatus side control unit.

The communication unit 201 has a communication control means using TCP/IP protocol such as, e.g., network interface, for transmitting and receiving information via the LAN 300 with the client device 400 and the image forming apparatus 100.

The memory unit 202 includes a rewritable memory device or devices such as, e.g., a flash memory or an HDD (Hard Disk Drive), for memorizing information received via the communication unit 101 and setting contents.

The judgment unit 203 judges as to whether the charge information stored in the memory unit 202 is in a renewal waiting state.

The print spooler 204 includes a memory device such as, e.g., RAM (Random Access Memory), and temporarily stores the printing job transmitted from the image forming apparatus 100.

The control unit 205 includes such as a CPU, not shown, and integrally controls the communication unit 201, the memory unit 202, the judgment unit 203, and the print spooler 204.

The client device 400 can be formed of a hardware resource such as a PC (Personal Computer) and is an information processing apparatus capable of producing printing jobs from document data produced from text and drawing producing application programs not shown, and sending the data via the LAN. The client device 400 is connected to a display unit 401 having a display means such as, e.g., a CRT (Cathode Ray Tube) and a liquid crystal display. The display unit 401 is structured in displaying such as charge information sent from the charge apparatus 200.

Figure 2:
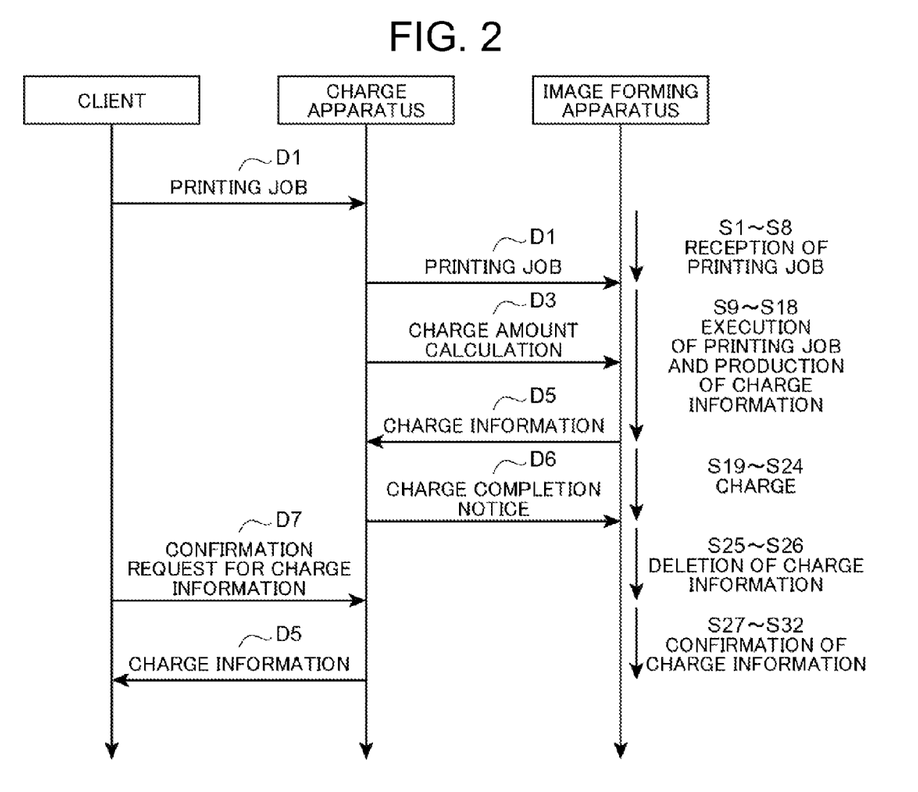
FIG. 2 is a sequence diagram illustrating operations of the image processing system according to the embodiment.
Figure 3:
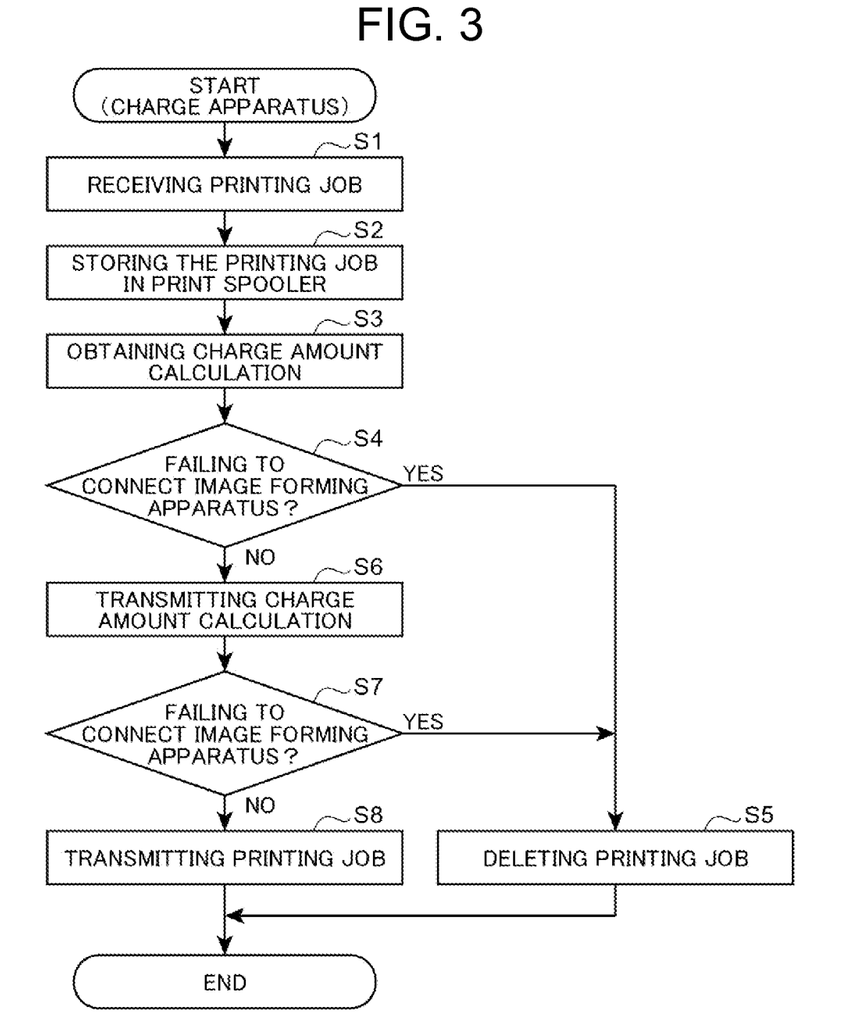
FIG. 3 is a flowchart showing operation at a charge apparatus the image processing system according to the embodiment.
Figure 4:
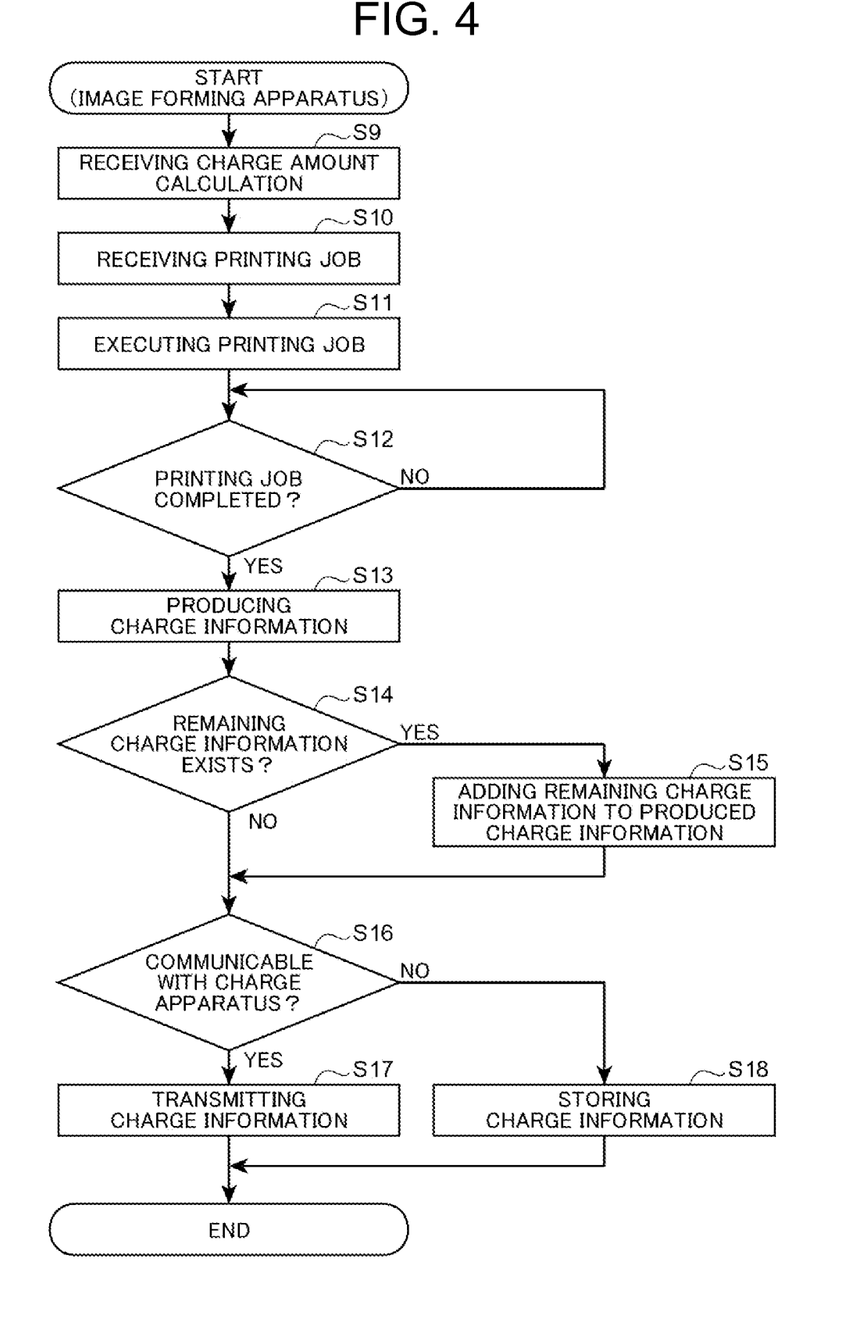
FIG. 4 is a flowchart showing operation at an image forming apparatus the image processing system according to the embodiment.
Figure 5:
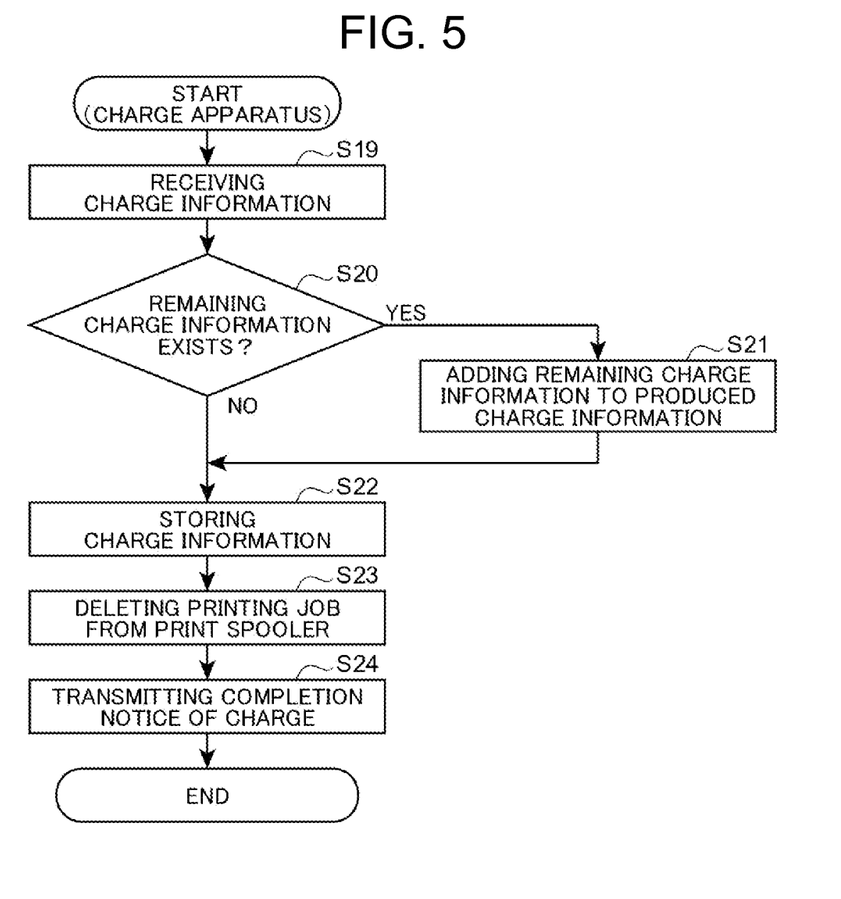
FIG. 5 is a flowchart showing operation at the charge apparatus the image processing system according to the embodiment.
Figure 6:
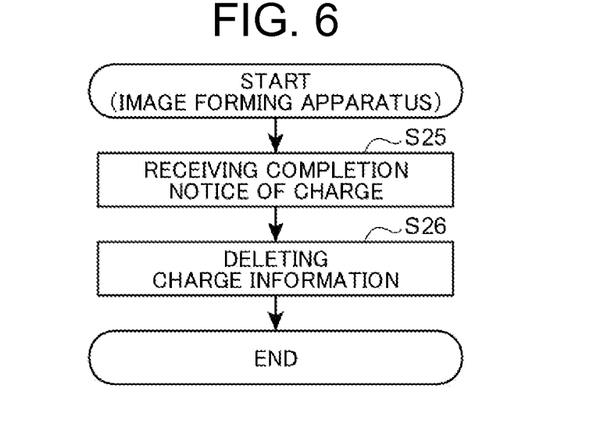
FIG. 6 is a flowchart showing operation at the image forming apparatus the image processing system according to the embodiment.
Figure 7:
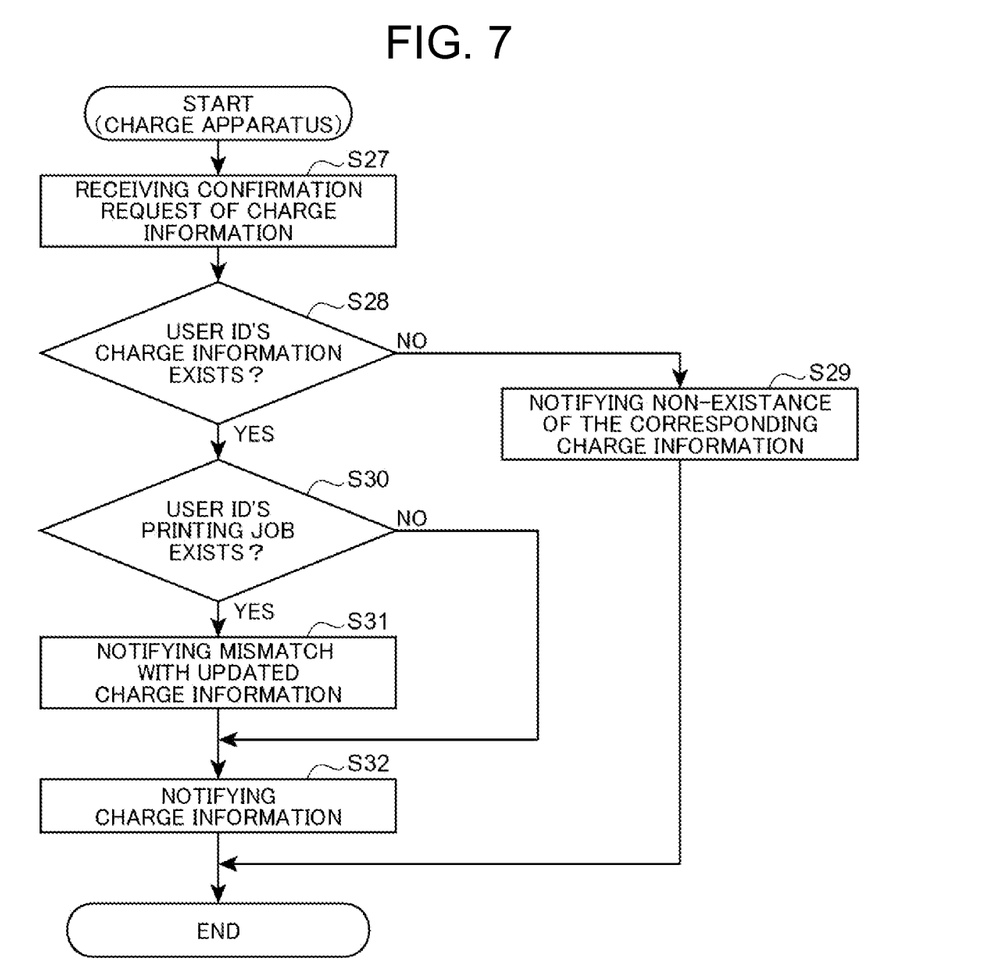
FIG. 7 is a flowchart showing operation at the charge apparatus the image processing system according to the embodiment.
Figure 8:
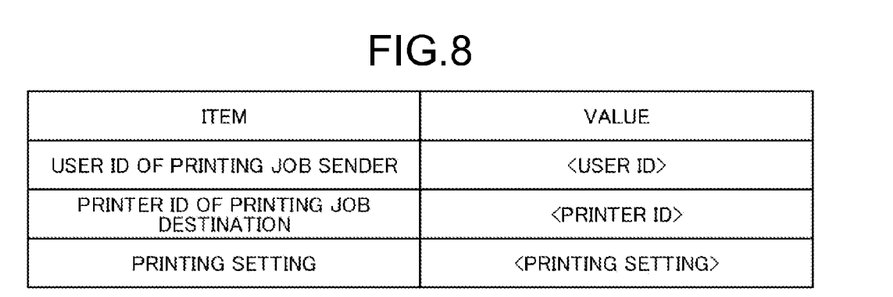
FIG. 8 is a table showing a format of a printing job according to the embodiment.
Figure 9:
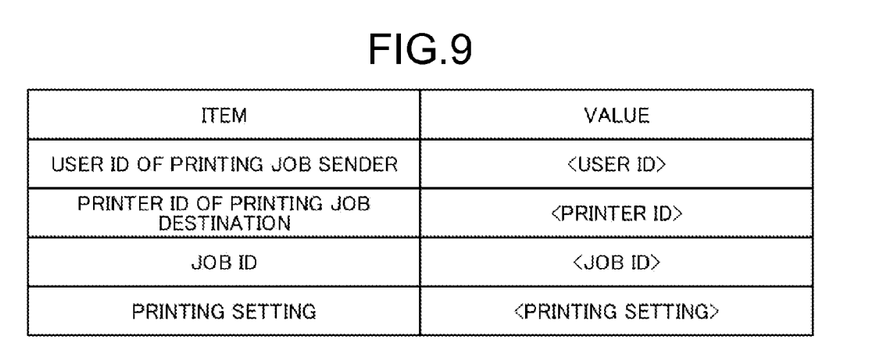
FIG. 9 is a table showing a format of a spooler job according to the embodiment.
Figure 10:
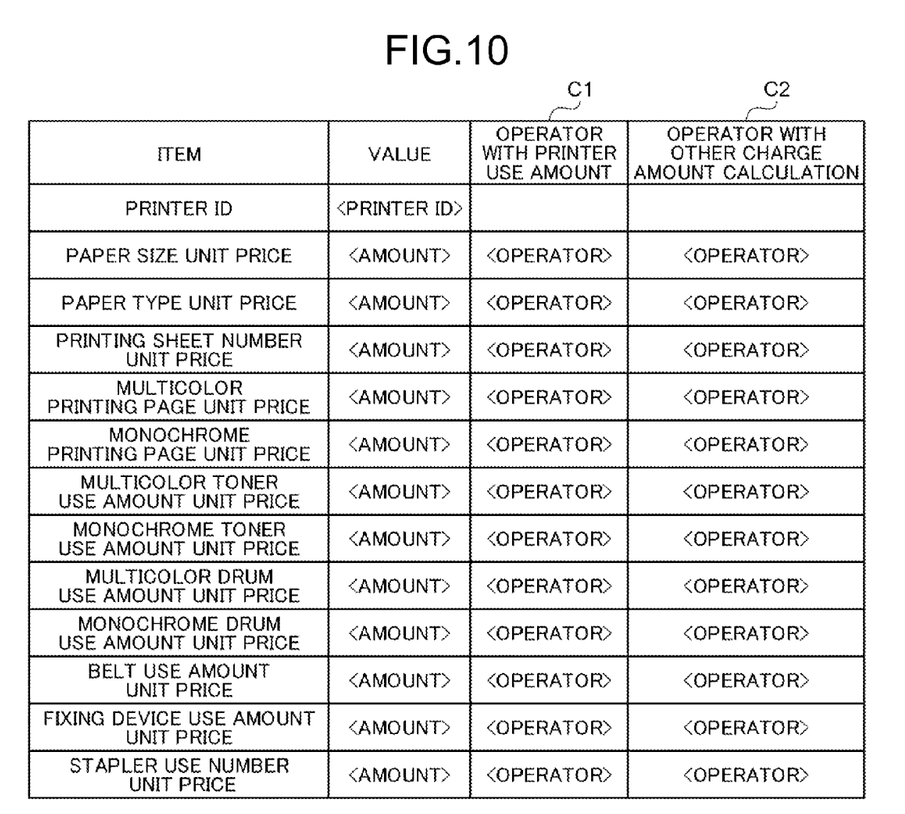
FIG. 10 is a table showing a format of a charge amount calculation according to the embodiment.
Figure 11:
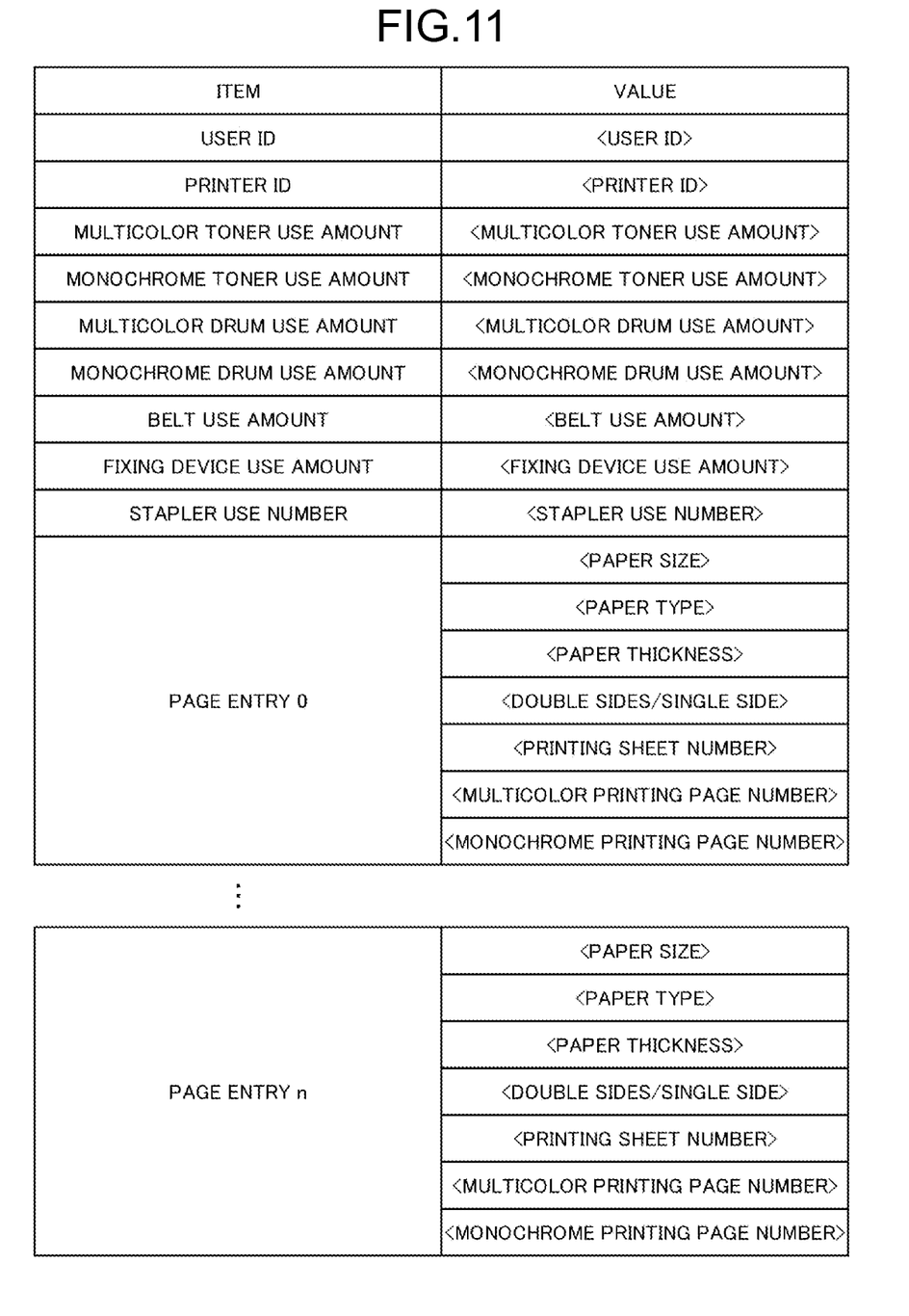
FIG. 11 is a table showing a format of printer use amounts according to the embodiment.
Figure 12:
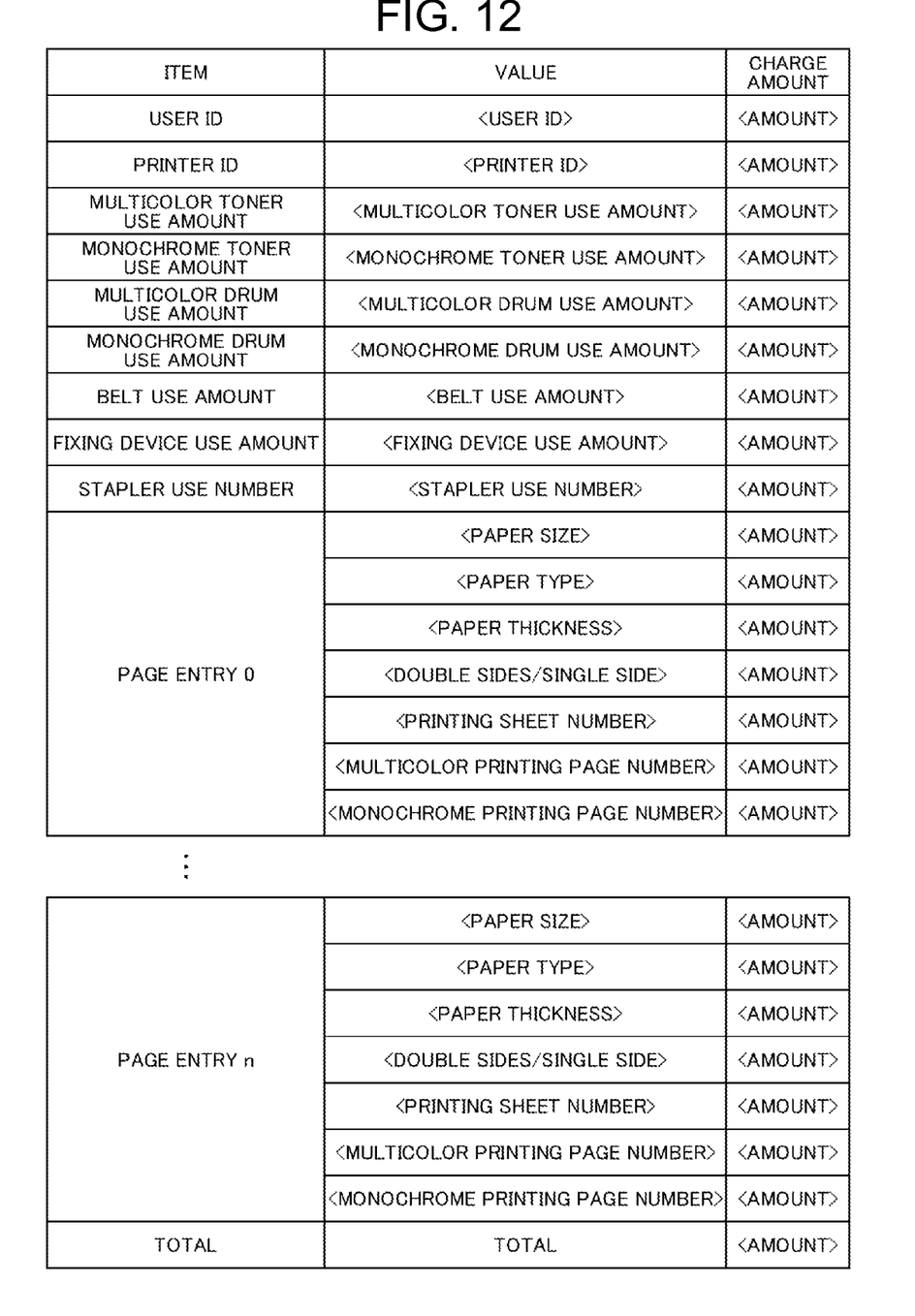
FIG. 12 is a table showing a format of charge information according to the embodiment.
Figure 13:
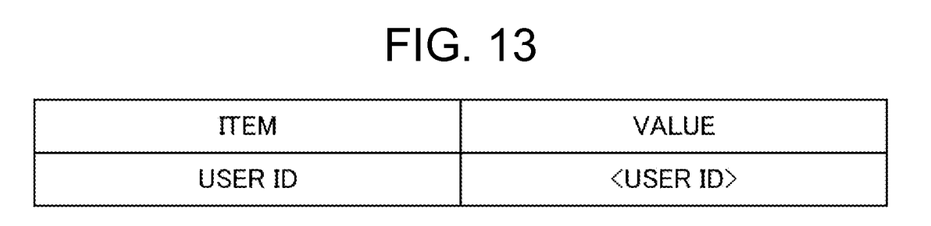
FIG. 13 is a table showing a format of a charge completion notice according to the embodiment.

In operation of the image processing system according to this embodiment, FIG. 2 is a sequence diagram illustrating operations of the image processing system according to the embodiment; FIGS. 3, 5, 7 are a flowchart showing operation at a charge apparatus the image processing system according to the embodiment; FIGS. 4, 6 are a flowchart showing operation at an image forming apparatus the image processing system according to the embodiment; FIG. 8 is a table showing a format of a printing job according to the embodiment; FIG. 9 is a table showing a format of a spooler job according to the embodiment; FIG. 10 is a table showing a format of a charge amount calculation according to the embodiment; FIG. 11 is a table showing a format of printer use amounts according to the embodiment; FIG. 12 is a table showing a format of charge information according to the embodiment; FIG. 13 is a table showing a format of a charge completion notice according to the embodiment.

First, at Step S1 shown in FIGS. 2, 3, the communication unit 201 of the charge apparatus 200 receives a printing job D1 transmitted from the client device 400. The printing job D1 according to this embodiment is data in a format shown in FIG. 8 and includes, as items, a user ID as a sender of the printing job, a printer ID as a destination of the printing job, and a printing setting. The user ID is information specifying the client device of the origin of print, and can be made of, such as, e.g., login information for making login to the client device 400. The printer ID is information specifying an image forming apparatus of the printing destination, and is properly made of, such as, e.g., MAC (Media Access Control) address assigned respectively to the image forming apparatus. The printing setting is information indicating printing conditions executed at the image forming apparatus 100, such as, e.g., paper type and paper size of the paper to be printed, and a delivery tray.

Subsequently, the control unit 205 renders the print spooler 204 memorize a spool job D2 made of the received printing job D1 in addition of the job ID (step S2). The job ID is information specifying the printing job, and can use such as, e.g., issue data and time information (YYYY/MM/DD/HH:MM:SS) of the printing job. The spool job D2 according to this embodiment includes data having a format shown in FIG. 9, and as items, at least, the user ID of the sender of the printing job, the job ID, and the printing setting.

The control unit 205 obtains charge amount calculation D3 already memorized in the memory unit 202 (Step S3). The charge amount calculation D3 according to this embodiment includes data in a format shown in FIG. 10, and includes as items, at least, printer ID, charge amount unit price, operator with printer use amount, and operator with other charge amount. The charge amount unit price means unit prices of printing sheet, and printing page number of paper, and consumables' use amounts, used for printing processing at the image forming apparatus 100. The printer use amount means printing sheet and printing page number of paper, and consumables' use amounts, used for printing processing at the image forming apparatus 100, and is information memorized in the memory unit 102 at a time of processing completion at the image forming apparatus 100. The printer use amount D4 as printer use amount according to this embodiment, includes data having a format shown in FIG. 11, and includes at least the user ID and the printer ID. The operator (C1) with the printer use amount, shown in FIG. 10, is, e.g., a multiplication operator such as, e.g., "*" and is an operator used for converting the printer use amount D4 into the charge amount using the charge amount unit price. The operator (C2) with the other charge amount is, e.g., a summation operator such as, e.g., "+" and is an operator used for accumulating the respective charge amounts when plural charge amounts converted from the operator with the printer use amount D4, exist.

After obtaining the charge amount calculation D3, the control unit 205 confirms as to whether to connect the image forming apparatus 100 via the communication unit 201. Where the connection with the image forming apparatus 100 is no good or namely where the control unit 205 cannot connect the image forming apparatus 100, the control unit 205 deletes the printing job D1 in the spool job D2 memorizing the print spooler 204 at Step S2, and ends the processing as an error occurs (Step S5).

To the contrary, where the connection with the image forming apparatus 100 is not no good or namely where the control unit 205 can connect the image forming apparatus 100, the control unit 205 (Step S4, No), the control unit 205 sends the charge amount calculation D3 to the image forming apparatus 100 via the communication unit 201 (Step S6).

The control unit 205 confirms as to whether the connection with the image forming apparatus 100 via the communication unit 201 is possible. Where the connection with the image forming apparatus 100 is no good or namely where the control unit 205 fails to connect the image forming apparatus 100 (Step S7 Yes), the control unit 205 deletes the printing job D1 in the spool job D2 memorizing the print spooler 204 at Step S2, and ends the processing as an error occurs (Step S5).

To the contrary, where the connection with the image forming apparatus 100 is not no good or namely where the control unit 205 fails to connect the image forming apparatus 100 (Step S7 No), the control unit 205 transmits the printing job D1 in the spool job D2 via the communication unit 201 to the image forming apparatus 100 (Step S8), and ends the processing.

Subsequently, at Steps S9, shown in FIGS. 2, 4, the control unit 104 of the image forming apparatus 100 receiving the charge amount calculation D3 sent at Step S6 in FIG. 3 via the communication unit 101 receives the printing job D1 sent continuously at Step S8 (Step S10).

The control unit 104 executes the printing job D1 by controlling the printing unit 103 (Step S11), and with the completion of this step (Step S12 Yes), produces the charge information (Step S13).

The charge information D5 according to this embodiment includes data having a format shown in FIG. 12, and includes as items, at least the printer ID and the user ID. The control unit 104 executes operations for the itemized values of the charge amount calculation D3 received at Step S9 and the itemized values of the printer use amount D4 stored in the memory unit 102, using the operator C1 with the printer use amount, described in the charge amount calculation D3. The control unit 104 further executes operations for the obtained charge amount calculation consequence and the charge amount calculation consequence of other items obtained through substantially the same operation method, using the operator C2 with other charge amount calculation amount described in the charge amount calculation D3, thereby obtaining the value of "total" of the charge information D5. For example, in a case where the unit price of the printing sheet in the charge amount calculation D3 is "10 (yen)," where the operator C1 with the printer use amount is "*", and where the printing sheet number of the printer use amount D4 is "20 (sheets)", the charge amount with respect to the printing sheets is calculated as "10*20=200". Where the operator C2 with other charge amount calculation consequences describe in the charge amount calculation D3 is "+", the control unit 104 sets the value in which "200" is added to other charge amount calculation consequences as the "total" value of the charge information D5.

Subsequently, the control unit 104 confirms as to whether the charge information D5 remaining in the memory unit 102 exists. Where the charge information D5 remaining in the memory unit 102 exists (Step S14 Yes), the control unit 104 adds the charge amounts of the respective items of the charge information D5 obtained at Step S13 to the charge amounts of the respective items of the charge information D5 remaining in the memory unit 102, thereby making a transition of the processing to Step S16.

To the contrary, if the charge information D5 remaining in the memory unit 102 does not exist (Step S14 No), the control unit 104 confirms as to whether the communication with the charge apparatus 200 via the communication unit 101 is possible. If the communication with the charge apparatus 200 is possible (Step S16 Yes), the control unit 104 sends the charge information D5 to the charge apparatus 200 (Step S17), and ends the processing. If the communication with the charge apparatus 200 is not possible (Step S16 No), the control unit 104 renders the memory unit 102 store the charge information D5 (Step S18), and ends the processing.

Subsequently, at Step S19 in FIGS. 2, 5, the control unit 205 of the charge apparatus 200 receiving the charge information D5 sent at Step S17 shown in FIG. 4 via the communication unit 201 confirms as to whether the charge information D5 remaining in the memory unit 202 exists. If the charge information D5 remaining in the memory unit 202 exists (Step S20 Yes), the control unit 205 adds the charge amounts of the respective items of the charge information D5 received at Step S19 to the charge amounts of the respective items of the charge information D5 remaining in the memory unit 202 (Step S21), thereby rendering the processing move to Step S22.

On the other hand, if the charge information D5 remaining in the memory unit 202 does not exist (Step S20 No), the control unit 205 memorizes, in the memory unit 202, the charge information D5 received at Step S19 or the charge information D5 to which the charge amounts of the respective items are added (Step S22).

The control unit 205 deletes the printing job D1 from the spool job D2 memorized in the print spooler 204 at Step S23.

The control unit 205 sends a charge completion notice D6 to the image forming apparatus 100 via the communication unit 201 (Step S24), and ends the processing. It is to be noted that the charge completion notice D6 according to the embodiment includes data having a format shown in FIG. 13 and includes, as items, the user ID at least.

At Steps S25 shown in FIGS. 2, 6, the control unit 104 of the image forming apparatus 100 receiving the charge completion notice D6 sent at Step S24 in FIG. 5 deletes the charge information D5 from the memory unit 102 (Step S26), and ends the processing.

Figure 14:
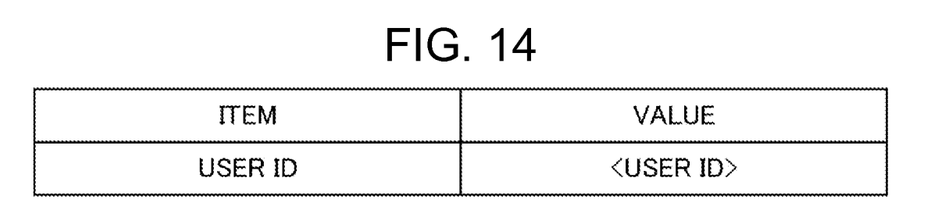
FIG. 14 is a table showing a format of a confirmation request of the charge information according to the embodiment.
Figure 15:
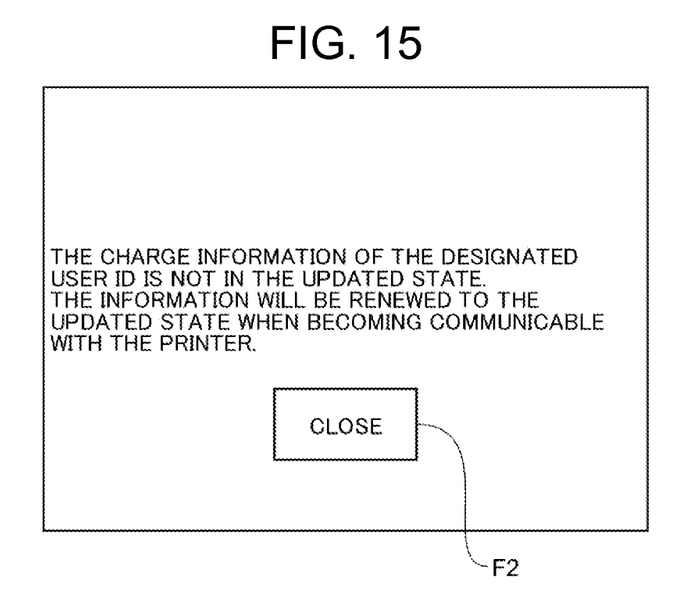
FIG. 15 is a view showing a screen for notifying the charge information according to the embodiment.
Figure 16:
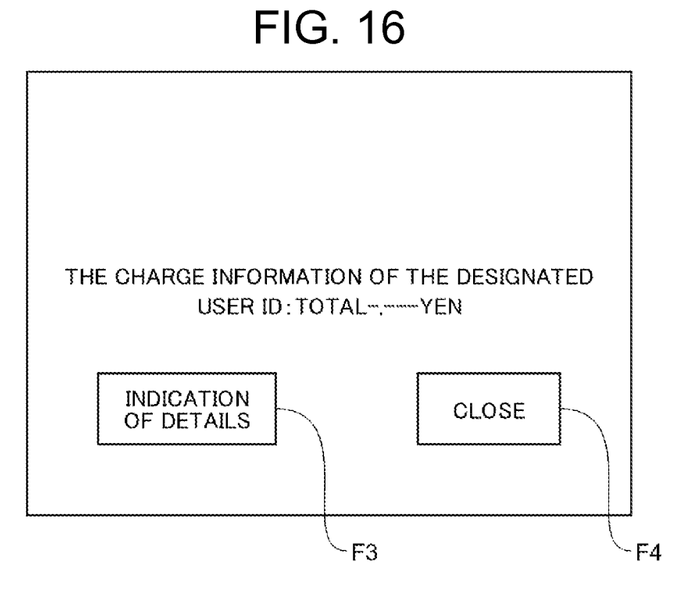
FIG. 16 is a view showing another screen for notifying the charge information according to the embodiment.
Figure 17:
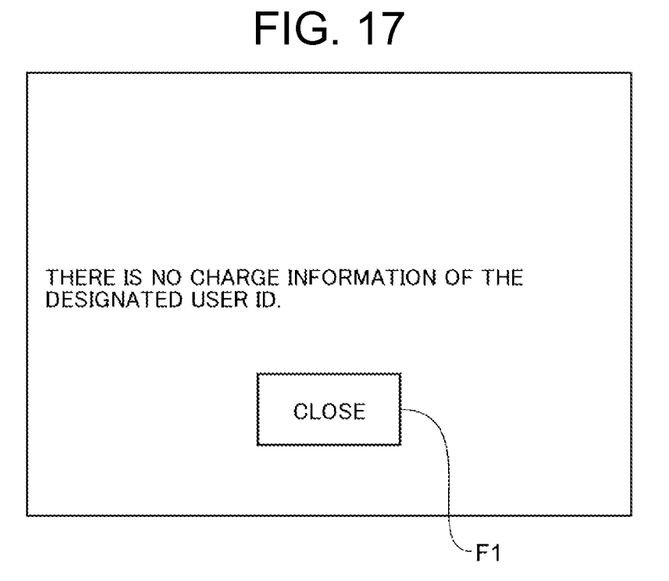
FIG. 17 is a view showing yet another screen for notifying the charge information according to the embodiment.

Subsequently, operation when a confirmation request of charge information is sent from the client device 400 to the charge apparatus 200, is described in reference to FIGS. 2, 7, and 14 to 17. FIG. 14 is a table showing a format of a confirmation request D7 of the charge information according to the embodiment. FIGS. 15 to 17 are views showing screens respectively for notifying the charge information according to the embodiment.

At Step S27 in FIGS. 2, 7, when receiving the confirmation request D7 of the charge information sent from the client device 400 via the communication unit 201, the judgment unit 203 of the charge apparatus 200 confirms as to whether the charge information D5 of the user ID contained in the received confirmation request D7 of the charge information exists in the memory unit 202. It is to be noted that the confirmation request D7 of the charge information according to the embodiment includes data having a format shown in FIG. 14 and includes as items the user ID at least.

Where the charge information D5 of the user ID contained in the received confirmation request D7 of the charge information exists in the memory unit 202 (Step S28 Yes), the judgment unit 203 confirms as to whether the spool job D2 corresponding to the user ID contained in the confirmation request D7 of the charge information exists in the print spooler 204. Where the spool job D2 exists in the print spooler 204 (Step S30 Yes), the judgment unit 203 judges that there are a mismatch between the charge information D5 notified to the user manipulating the client device 400 and the updated charge information D5, or namely that the notified charge information D5 is not in the updated state but in a renewal waiting state, and reports this situation to the control unit 205. The control unit 205 receiving this report notifies the user who manipulates the client device 400 via the communication unit 201 of the above situation (Step S31). As an example of a method for notifying the mismatch between the notified charge information D5 and the updated charge information D5, exemplified is to make a display of a notifying screen as shown in, e.g., FIG. 15 with a display unit 401 connected to the client device 400. The control unit 205 of the charge apparatus 200 notifies the client device 400 of the charge information D5 upon a pushing-down manipulation of a "close" button F2 in the notification screen (Step S32). As another example for notifying the charge information D5, for example, exemplified is to make a display of a notifying screen as shown in, e.g., FIG. 16 with the display unit 401 connected to the client device 400. The control unit 205 of the charge apparatus 200 displays the charge information corresponding to the user ID in an itemized way upon a pushing-down manipulation of an "indication of details" button F3 in the notification screen. If the "close" button F4 in the notifying screen is pushed down, the control unit 205 of the charge apparatus 200 ends the processing.

Where the charge information D5 of the user ID contained in the received confirmation request D7 of the charge information does not exist in the memory unit 202 (Step S28 Yes), the judgment unit 203 reports this non-existence state to the control unit 205. The control unit 205 receiving this report notifies the user manipulating the client device 400 of the non-existence of the corresponding charge information D5 via the communication unit 201 (Step S29). As an example of a method for notifying the non-existence of the corresponding charge information D5, for example, exemplified is to make a display of a notifying screen as shown in, e.g., FIG. 17 with the display unit 401 connected to the client device 400. If the "close" button F1 in the notifying screen is pushed down, the control unit 205 of the charge apparatus 200 ends the processing.

Where the spool job D2 does not exist in the spool job D2 (Step S30 No), the judgment unit 203 reports the non-existence state to the control unit 205, and the control unit 205 receiving the report notifies the client device 400 of the charge information D5 via the communication unit 201 (Step S32), thereby ending the processing.

As described above, according to the embodiment of the invention, the user can recognize errors of the charge information by detecting the charge information held at the charge apparatus as in the renewal waiting state and by notifying the user of this state.

This invention is applicable to printers, facsimile machines, multi-function peripherals, and photocopiers, which are connected to the charge apparatus.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image processing system including an image forming apparatus and a charge apparatus connected to the image forming apparatus, the image forming apparatus comprising:
   a first communication unit communicating with the charge apparatus;
   a first memory unit storing charge information with respect to a prescribed process executed by the image processing apparatus; and
   a first control unit judging whether communication with the charge apparatus is available, the first control unit transmitting the charge information stored in the first memory unit through the first communication unit to the charge apparatus when the communication is available, and the charge apparatus comprising:
   a second communication unit communicating with the image forming apparatus, the second communication unit receiving the charge information from the image forming apparatus;
   a second memory unit storing the charge information received from the image forming apparatus;
   a judgment unit judging, upon receipt of a confirmation request of the charge information from a user, whether a prescribed condition is satisfied, the judgment unit transmitting judgment information indicating that the prescribed condition is satisfied; and
   a second control unit performing notification of attention information relating to renewal of the charge information stored in the second memory unit to the user upon receipt of the judgment information from the judgment unit.

2. The image processing system according to claim 1, wherein the charge apparatus further comprises a spooler spooling a printing job, and
   wherein the judgment unit judges that the prescribed condition is satisfied when the spooler includes the printing job.

3. The image processing system according to claim 1, wherein the second control unit shows the user the charge information stored in the second memory unit after performing the notification.

4. The image processing system according to claim 1, wherein the charge information includes a charge amount calculated based on charge unit prices relating to the prescribed process and use amounts of the image forming apparatus relating to the prescribed process.

5. The processing system according to claim 1, wherein the charge information further includes user identification.

6. The image processing system according to claim 1, further comprising a display unit for displaying the notification and the charge information.

7. A charge apparatus connected to an image forming apparatus, comprising:

a communication unit communicating with the image forming apparatus, the communication unit receiving unit charge information relating to a prescribed process executed at the image forming apparatus from the image forming apparatus;

a memory unit storing the charge information received from the image forming apparatus;

a judgment unit judging whether a prescribed condition is satisfied upon receipt of a confirmation request of the charge information from a user, the judgment unit transmitting judgment information indicating that the prescribed condition is satisfied; and a control unit performing notification of attention information relating to renewal of the charge information stored in the memory unit to the user upon receipt of the judgment information from the judgment unit.

8. The charge apparatus according to claim 7, further comprising a spooler spooling a printing job, wherein the judgment unit judges that the prescribed condition is satisfied when the spooler includes the printing job.

9. The charge apparatus according to claim 7, wherein the control unit shows the user the charge information stored in the second memory unit after performing the notification.

10. The charge apparatus according to claim 7, wherein the charge information includes a charge amount calculated based on charge unit prices relating to the prescribed process and use amounts of the image forming apparatus relating to the prescribed process.

11. The image processing system according to claim 1, wherein the attention information indicates that there is a possibility that the charge information stored in the second memory unit is not the latest available.

12. The image processing system according to claim 2, wherein the image forming apparatus further includes an information processing apparatus that is connected to the charge apparatus and that transmits the printing job to the charge apparatus, wherein the second communication unit receives the printing job from the information processing apparatus, and wherein the spooler spools the printing job received through the second communication unit.

13. The charge apparatus according to claim 7, wherein the attention information indicates that there is a possibility that the charge information stored in the memory unit is not the latest available.

14. The charge apparatus according to claim 8, wherein the communication unit receives the printing job from an external apparatus, and wherein the spooler spools the printing job received through the communication unit.

15. The charge apparatus according to claim 7, wherein the charge information further includes user identification information.

* * * * *